(12) United States Patent
Azuma et al.

(10) Patent No.: US 9,091,901 B2
(45) Date of Patent: Jul. 28, 2015

(54) STEREOSCOPIC IMAGE DISPLAY DEVICE

(75) Inventors: Hiroshi Azuma, Saitama-ken (JP); Takashi Sasabayashi, Saitama-ken (JP)

(73) Assignee: Japan Display Inc., Tokyo (JP)

( * ) Notice: Subject to any disclaimer, the term of this patent is extended or adjusted under 35 U.S.C. 154(b) by 267 days.

(21) Appl. No.: 13/604,817

(22) Filed: Sep. 6, 2012

(65) Prior Publication Data

US 2013/0257828 A1    Oct. 3, 2013

(30) Foreign Application Priority Data

Mar. 29, 2012   (JP) ................................. 2012-076946

(51) Int. Cl.
| G02F 1/1335 | (2006.01) |
|---|---|
| G02F 1/13 | (2006.01) |
| G02F 1/29 | (2006.01) |
| G02B 27/22 | (2006.01) |
| H04N 13/04 | (2006.01) |
| G02F 1/1343 | (2006.01) |

(52) U.S. Cl.
CPC .............. G02F 1/29 (2013.01); G02B 27/2214 (2013.01); G02F 1/134309 (2013.01); *G02F 2001/294* (2013.01); *H04N 13/0452* (2013.01); *H04N 13/0454* (2013.01); *H04N 13/0456* (2013.01)

(58) Field of Classification Search
CPC ........... G02B 27/2214; H04N 13/0452; H04N 13/0454; H04N 13/0456
USPC .............................................. 349/13, 15, 200
See application file for complete search history.

(56) References Cited

U.S. PATENT DOCUMENTS

| 7,609,330 | B2 * | 10/2009 | Kim ................................. 349/15 |
|---|---|---|---|
| 2009/0153653 | A1 * | 6/2009 | Lee et al. ......................... 348/59 |
| 2012/0008057 | A1 * | 1/2012 | Takahashi et al. .............. 349/15 |
| 2012/0300042 | A1 * | 11/2012 | Yun et al. ......................... 348/51 |
| 2013/0258219 | A1 * | 10/2013 | Takagi et al. ................... 349/15 |

FOREIGN PATENT DOCUMENTS

| JP | 2007-17510 | 1/2007 |
|---|---|---|
| JP | 2011-154197 | 8/2011 |
| JP | 2012-18349 | 1/2012 |

OTHER PUBLICATIONS

U.S. Appl. No. 13/606,652, filed Sep. 7, 2012, Azuma, et al.
Japanese Office Action issued Mar. 31, 2015, in Patent Application No. 2012-076946 with English translation.

* cited by examiner

*Primary Examiner* — Edward Glick
*Assistant Examiner* — Mark Teets
(74) *Attorney, Agent, or Firm* — Oblon, McClelland, Maier & Neustadt, L.L.P.

(57) ABSTRACT

A stereoscopic image display device includes a display panel having a first display area switchable to a two-dimensional display mode or a three-dimensional display mode and a second display area. A liquid crystal lens unit is arranged above the display panel and having a liquid crystal layer. The first substrate includes a first electrode formed in the first and second display areas for controlling alignment of the liquid crystal layer, a second electrode passing the second display area for supplying a voltage to the first electrode of the first display area, and a third electrode arranged between the second electrode and the liquid crystal layer in the second display area so that the third electrode has an overlap area with the second electrode in plane. The second substrate includes a fourth electrode formed so as to control the alignment of the liquid crystal layer with the first electrode.

10 Claims, 4 Drawing Sheets

STEREOSCOPIC IMAGE DISPLAY DEVICE

CROSS-REFERENCE TO RELATED APPLICATION

This application is based upon and claims the benefit of priority from prior Japanese Patent Application No. 2012-076946, filed Mar. 29, 2012, the entire contents of which are incorporated herein by reference.

FIELD

Embodiments described herein relate generally to a stereoscopic image display device including a domain in which a two-dimensional display mode and a three-dimensional display mode are switchable.

BACKGROUND

In recent years, in flat displays such as a liquid crystal display device, a stereoscopic image display device using stereoscopic images is known. One of the stereoscopic image display device uses a gradient index lenses such as a liquid crystal lens arranged in front of a display panel. By controlling alignment of liquid crystal molecules of a liquid crystal layer by impressing voltage, the liquid crystal lens functions so as to give a distribution of refractive index in the liquid crystal layer, and to make operate as a lens. The stereoscopic image display device is realized with the liquid crystal lens by having a right eye image displayed on the display device enter into a viewer's right eye, and having a left eye image enter in the viewer's left eye. Moreover, it is also possible to switchover between the two-dimensional display mode and the three-dimensional display mode by switching ON and OFF the impressed voltage to the liquid crystal lens.

Furthermore, in the case of the liquid crystal lens, it is also possible to operate a portion of the liquid crystal lens unit as a lens corresponding to a portion of the display device. Therefore, according to this structure, a partial three-dimensional display is possible in which the three-dimensional display is performed in an area of the display device while making the two-dimensional display in other areas.

In order to enable the partial three-dimensional display, it is necessary to form an alignment control electrode for carrying out alignment control of the liquid crystal molecules in an area of the liquid crystal lens, and to enable driving of the alignment control electrode formed in one area independently from other electrodes. Therefore, it is thought to provide a voltage supply electrode for carrying out voltage impressing to the alignment control electrode in a different layer from the alignment control electrode. However, in such structure, there is a possibility that electric field generated by the voltage supplied to the voltage supply electrode may affect the alignment of the liquid crystal molecule. If alignment change of the liquid crystal molecules arises, there is a possibility that distribution of refractive index may change from a desired distribution, and uneven coloring, etc., may be resulted by the voltage supply electrode at the time of the three-dimensional display.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Figure 1:
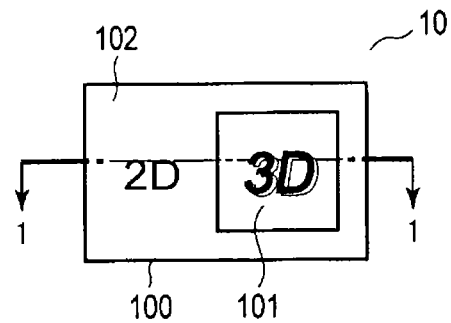
FIG. 1 is an elevation view of a stereoscopic image display device according to an embodiment.

A stereoscopic image display device according to an exemplary embodiment of the present invention will now be described with reference to the accompanying drawings wherein the same or like reference numerals designate the same or corresponding parts throughout the several views.

According to one embodiment, a stereoscopic image display device includes: a display panel including a first display area switchable to a two-dimensional display mode or a three-dimensional display mode and a second display area; and a liquid crystal lens unit arranged on a surface side of the display panel and having a liquid crystal layer, distribution of refractive index of the liquid crystal layer being changed by impression of voltage between a first substrate and a second substrate facing the first substrate; wherein the first substrate includes a first electrode formed in the first and second display areas for controlling alignment of the liquid crystal layer, a second electrode formed in a different layer from the first electrode passing the second display area for supplying a voltage to the first electrode of the first display area, and a third electrode arranged between the second electrode and the liquid crystal layer in the second display area so that the third electrode has an overlap area with the second electrode in plane, and the second substrate includes a fourth electrode formed so as to control the alignment of the liquid crystal layer with the first electrode.

According to other embodiment, a stereoscopic image display device includes: a display panel including a first display area switchable to two-dimensional display mode or three-dimensional display mode and a second display area; and a liquid crystal lens unit arranged on a surface side of the display panel and having a liquid crystal layer, distribution of refractive index of the liquid crystal layer being changed by impression of voltage between a first substrate and a second substrate facing the first substrate: wherein the first substrate includes a first electrode formed in the first and second display areas for controlling alignment of the liquid crystal layer, a second electrode formed in a different layer from the first electrode passing the second display area for supplying a voltage to the first electrode of the first display area, and a third electrode arranged between the second electrode and the liquid crystal layer so that the third electrode has an overlap area with the second electrode in plane in a boundary portion between the first area and the second area, and the second substrate includes a fourth electrode formed so as to control the alignment of the liquid crystal layer with the first electrode.

FIG. 1 is an elevation view of the stereoscopic image display device according to an embodiment. The stereoscopic image display device 10 shown in FIG. 1 includes a display area 100 in which images are displayed. According to this embodiment, the display device 10 is a stereoscopic image display device in which the partial three-dimensional display is possible. As shown in FIG. 1, the display area 100 includes, a two dimensional/three-dimensional display switchable area 101 (hereafter referred as a selection display area), and a two dimensional/three-dimensional display non-switchable area 102 (hereafter referred as a fixed display area), respectively.

The selection display area 101 is an area provided in an intermediate inside position rather than a perimeter part of the display area 100, in which the two-dimensional display mode and the three-dimensional display mode are switchable. In this embodiment, it is possible to arrange the selection display area 101 apart from ends of the display area 100. Of course, the selection display area 101 may contact with the end of the display area 100. Moreover, in FIG. 1, although one selection display area 101 is provided in the display area 100, two or more selection display areas 101 may be formed. Furthermore, one selection display area 101 may be divided into two or more areas.

The fixed display area 102 is formed so as to surround the selection display area 101 of the display area 100, and is a display area in which the two-dimensional display mode and the three-dimensional display mode cannot be switched. In FIG. 1, the fixed display area 102 is made into the area in which the two-dimensional display is possible. Also the fixed display area 102 may be the area in which the three-dimensional display is possible.

Figure 2A:
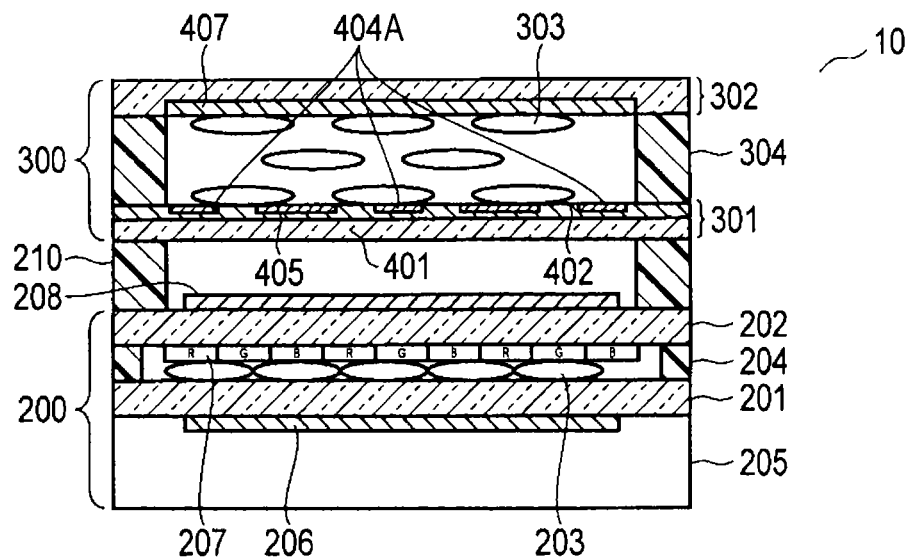
FIGS. 2A and 2B are cross-sectional views of a two-dimensional/three-dimensional switchable display area taken along line 1-1 shown in FIG. 1.
Figure 2B:
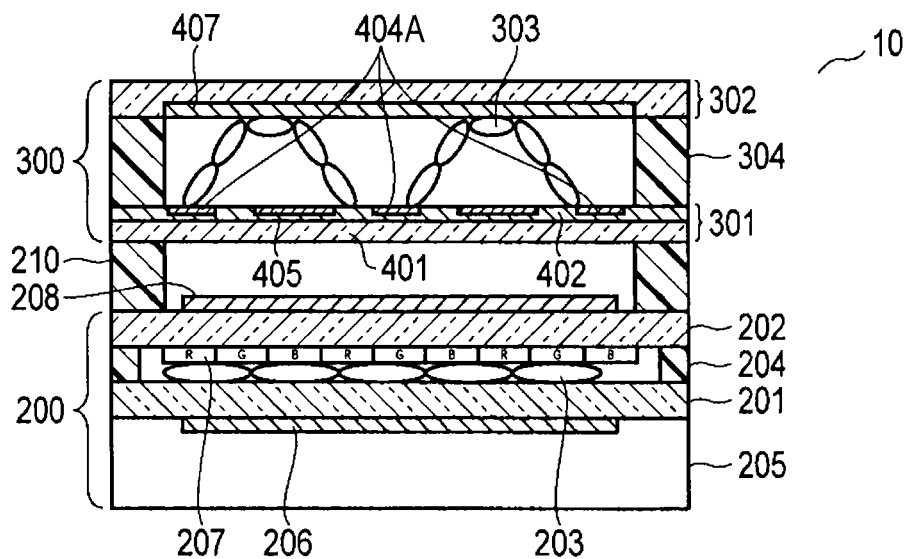

FIGS. 2A and 2B are cross-sectional views showing the schematic structure of the selection display area 101 taken along line 1-1 of the display device shown in FIG. 1 according to this embodiment. Here, FIG. 2A shows a state where voltage is not impressed to a liquid crystal layer 303 in the liquid crystal lens unit 300, and FIG. 2B shows a state where voltage is impressed to the liquid crystal layer 303 in the liquid crystal lens unit 300.

As shown in FIGS. 2A and 2B, the stereoscopic image display device 10 includes a display panel 200 and the liquid crystal lens unit 300. The display panel 200 and the liquid crystal lens unit 300 are stuck so as to have a predetermined gap therebetween by a spacer 210. Air layer is provided between the display panel 200 and the liquid crystal lens unit 300, for example.

However, in FIGS. 2A and 2B, the explanation is made as if only the selection display area 101 is constructed by the discreet display panel 200 and the discrete liquid crystal lens unit 300 in order to explain simply. However, practically, the display panel 200 and the liquid crystal lens unit 300 are formed in whole display area 100 including the fixed display area 102. That is, a portion thereof is shown as an example, and following explanation is also the same.

The display panel 200 displays images. FIG. 2A and FIG. 2B show an example which uses the liquid crystal display panel as the display panel 200. However, the display panel 200 is not limited to the liquid crystal display panel, and also an organic electroluminescence display panel or a plasma display panel may be used.

The display panel 200 is constituted by holding a liquid crystal layer 203 between an array substrate 201 and a counter substrate 202. The array substrate 201 and the counter substrate 202 are sealed with a sealing agent 204 in the circumference thereof. Further, they are stuck so as to have a predetermined gap therebetween by a spacer in the shape of a ball or a pillar (not shown). Moreover, a backlight 205 is arranged on the back side of the array substrate 201.

In the array substrate 201, pixel electrodes constituting pixels are formed in the shape of a matrix. A thin film transistor (TFT) is connected to each pixel electrode. When a corresponding TFT is switched ON, voltage is impressed to the liquid crystal layer 203 through the pixel electrode. Moreover, a polarizing plate 206 is formed on a light incident side of the array substrate 201.

A color filter 207 of red (R), green (G), and blue (B) is formed on the counter substrate 202 corresponding to each pixel, and further, a counter electrode is formed on the color filter 207. Moreover, a polarizing plate 208 is formed on the light emitting side of the counter substrate 202. The color filter 207 may be also formed on the array substrate 201 side.

In the liquid crystal display panel 200, the display is performed by controlling electric field generated in the liquid crystal layer which is held between the pixel electrode and the counter electrode by controlling the magnitude of the voltage impressed to the pixel electrode. The liquid crystal layer has characteristic that alignment of the liquid crystal molecule changes by impressing electric field, and the transmissivity of the light which passes the liquid crystal layer changes by the alignment of the liquid crystal molecule. The display in each pixel unit (pixel electrode unit) is performed by controlling the penetration of the light per pixel.

In the liquid crystal lens unit 300, the liquid crystal layer 303 is held between the array substrate 301 and the counter substrate 302. The array substrate 301 and the counter substrate 302 are stuck by a spherical or pillar shaped spacer (not shown) so as to have a predetermined gap therebetween, while the circumference is sealed with the sealing agent 304. According to this embodiment, bead-like spacers are used by scattering in place of the pillar shaped spacer in consideration of workability.

Figure 3A:
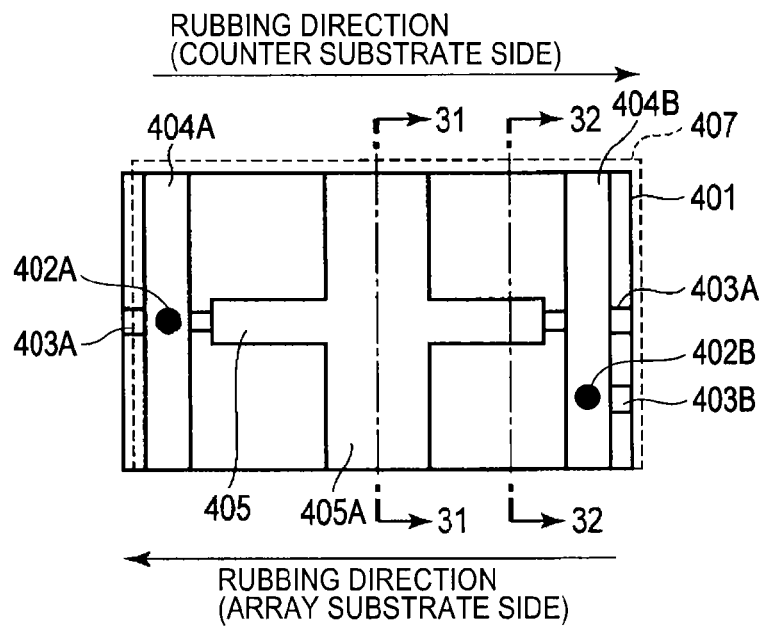
FIGS. 3A, 3B, and 3C are figures showing an electrode structure of an array substrate 301 of a liquid crystal lens unit 300.
Figure 3B:
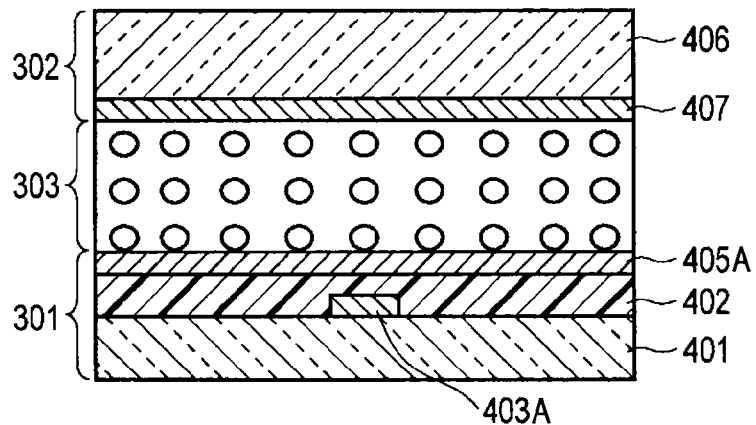
Figure 3C:
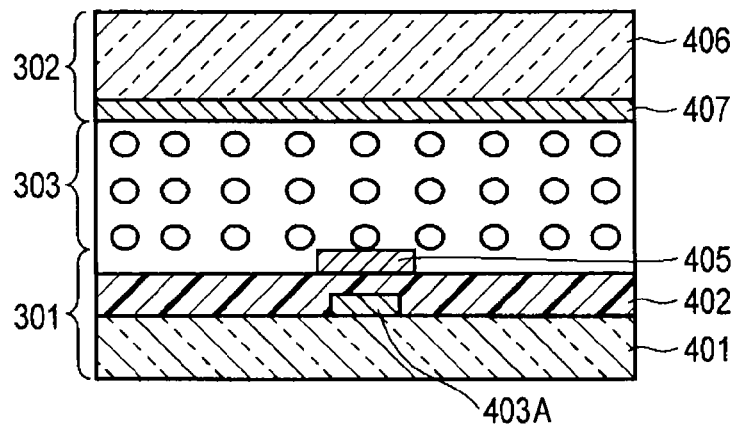

Hereafter, the liquid crystal lens unit 300 is explained with reference to FIGS. 2A and 2B and FIGS. 3A, 3B and 3C. FIGS. 3A and 3B are figures showing electrode structures of the array substrate 301 and the counter substrate 302 of the liquid crystal lens unit 300, respectively. FIG. 3A shows a plan view of the array substrate 301, FIG. 3B shows a cross-sectional view taken along line 31-31 shown in FIG. 3A, and FIG. 3C shows a cross-sectional view taken along line 32-32 shown in FIG. 3A.

Voltage supply electrodes 403A, 403B as a second electrode for supplying driving voltage to the selection display area 101 from a peripheral area of the display area 100 are formed on a glass substrate 401 which constitutes the array substrate 301. The voltage supply electrodes 403A, 403B are transparent electrodes, such as ITO (Indium Tin Oxide), and are covered with an insulating layer 402. Alignment control electrodes 404A and 404B are formed on the insulating layer 402. The voltage supply electrode 403A is electrically connected with the alignment control electrode 404A as a first electrode for the selection display area 101 through a contact hole 402A formed in the insulating layer 402. Further, the alignment control electrode 404B for the fixed display area 102 is electrically connected with a voltage supply electrode 403B wired separately through a contact hole 402B. Moreover, the voltage supply electrodes 403A, 403B are connected to a driving power supply source of the liquid crystal lens unit 300 which is not illustrated. At least a pair of alignment control electrodes 404A is formed in one selection display area 101. Then, the pair of alignment control electrodes 404A is connected with the common voltage supply electrode 403A.

The alignment control electrodes 404A, 404B as the first electrode are transparent electrodes, such as ITO formed on the insulating layer 402 which is a different layer from the glass substrate 401. By forming the alignment control electrodes 404A, 404B and the voltage supply electrodes 403A, 403B in different layers on the array substrate 301, even if the selection display area 101 is arranged apart from one end of the display area 100, it is possible to supply the driving voltage to the alignment control electrode 404A formed in the selection display area 101 apart from the end of the display area 100 independently from other electrodes. The alignment control electrode 404A impresses the driving voltage to the liquid crystal layer 303 for generating the distribution of refractive index in the liquid crystal layer 303 with a counter electrode 407. Here, FIGS. 2A and 2B show one example of formation of the alignment control electrode 404A in case two lens parts are formed in the selection display area 101. When two lens parts are formed, two pairs (four) of alignment control electrodes 404A are required. However, FIGS. 2A and 2B show the example which shares one alignment control electrode 404A located in the middle between the adjacent two lens parts.

Furthermore, a shield electrode 405 as a third electrode is formed on the insulating layer 402. As shown in FIGS. 2A and 2B, and FIGS. 3A, 3B and 3C, the shield electrode 405 is arranged on the same layer as the alignment control electrodes 404A, 404B in parallel with the voltage supply electrode 403A so that the voltage supply electrode 403A counters with the shield electrode 405. The shield electrode 405 and the alignment control electrodes 404A, 404B are arranged so as to be electrically isolated. Furthermore, an alignment control electrode portion 405A is formed integrally with the shield electrode 405. The alignment control electrode portion 405A is arranged in parallel to the alignment control electrodes 404A, 404B and located in a middle portion between the adjacent alignment control electrode 404A and the alignment control electrode 404B, which divides between the fixed display area 102 and the selection display area 101. It is desirable to form the shield electrode 405 so that the width of an overlapped portion of the shield electrode 405 with the voltage supply electrode 403A in plane is set at least equal to that of the voltage supply electrode 403A, and desirably to set more broadly than that of the voltage supply electrode 403A.

Further, an alignment film (not shown) is formed on the alignment control electrodes 404A, 404B, the voltage supply electrodes 403A, 403B, and the shield electrode 405 or through an insulating layer in the array substrate 301. A direction of rubbing processing of the alignment film orthogonally crosses the alignment control electrodes 404A, 404B as shown in FIG. 3A. Furthermore, since lateral alignment system is used according to this embodiment, the rubbing direction of the array substrate side is opposite to the counter substrate side as shown in FIG. 3A. The directions of the arrows in the rubbing directions of the counter substrate side and the array substrate side shown in FIG. 3A can be reversed as far as the directions are opposite each other.

A counter electrode 407 as a fourth electrode is formed on the glass substrate 406 in the counter substrate 302. Moreover, an alignment film (not shown) is formed on the surface of the counter electrode 407, or through an insulating layer in the counter substrate 302. Here, the direction of the rubbing processing of the alignment film is opposite to that of the array substrate 301.

The liquid crystal lens unit 300 switches the two-dimensional display mode and the three-dimensional display mode by controlling the magnitude of the voltage impressed to the alignment control electrode 404A through the voltage supply electrode 403A.

In a state where voltage is not supplied to the voltage supply electrode 403A, the voltage is not impressed to the alignment control electrode 404A, either. At this time, the potential of the alignment control electrode 404A becomes the same potential as the counter electrode 407, and electric field is not generated in the liquid crystal layer 303. Therefore, the liquid crystal molecule in the liquid crystal layer 303 is aligned so that the liquid crystal molecule is regulated in the rubbing direction as shown in FIG. 2A. In this case, the refractive index of the liquid crystal layer 303 becomes uniform, and the image light from the display panel 200 goes straight on the inside of the liquid crystal layer 303. In this case, the two-dimensional display is performed.

On the other hand, if voltage is impressed to the alignment control electrode 404A through the voltage supply electrode 403A, the potential of the alignment control electrode 404A becomes higher than the potential of the counter electrode 407. At this time, electric field is generated between the alignment control electrode 404A and the counter electrode 407. The liquid crystal molecule of the liquid crystal layer 303 aligns by the electric field as shown in FIG. 2B, and the refractive index of the liquid crystal layer 303 of a portion between the alignment control electrode 404A and the counter electrode 407 becomes small. For this reason, the distribution of refractive index of the liquid crystal layer 303 between the alignment control electrodes 404A changes, and the liquid crystal layer 303 functions as a lens. The three-dimensional display is performed by displaying the images which have azimuth difference on the display panel 200, and having each of the images which have azimuth difference enter in the different eyes of viewer through the liquid crystal lens unit 300.

In the above explanation, the liquid crystal lens unit 300 is arranged in front of the display panel 200, and the structure of the liquid crystal lens unit 300 is the same in the whole lens unit. In this case, since the liquid crystal lens unit 300 is arranged corresponding to the whole display area 100 including the selection display area 101 and the fixed display area 102, if the driving voltage is not supplied to the liquid crystal lens unit 300, i.e., 0 V, the two-dimensional display is made in the whole display panel 200. If a driving voltage, e.g., 5V, is supplied, the three-dimensional display is made in the whole display panel 200. Accordingly, the two-dimensional display mode and the three-dimensional display mode are switched in the whole display panel 200. According to this embodiment, the selection display area 101 is partially formed in the fixed display area 102. The fixed display area 102 and the selection display area 101 are selectively driven by detecting the supply of voltage from independent voltage supply electrodes 403A, 403B connected to the selection display area 101 and the fixed display area 102, respectively. Therefore, it becomes possible to display the images of the different display modes such as the second dimensional-display mode and the three-dimensional display mode in the fixed display area 102 and the selection display area 101, for example. That is, since the selection display area 101 is arranged in the fixed display area 102, the voltage supply electrode 403A for driving the selection display area 101 is necessarily required to be wired from the peripheral portion of the display area 100 to the selection display area 101 crossing the fixed display area 102. Especially, in case where the second dimensional-display display is made in the fixed display area 102, and the three-dimensional display is made in the selection display area 101, the larger driving voltage of (5V) which is necessary to make the three-dimensional display in the selection display area 101 is impressed to the fixed display area 102 through the voltage supply electrode 403A. That is, the larger driving voltage of 5V, not the driving voltage of 0 V which is necessary to drive the fixed display area 102, is impressed to the fixed display area 102. In order to control the influence by the larger voltage, the shield electrode 405 is arranged in an area in which the voltage supply electrode 403A crosses the fixed display area 102 so that the influence of unnecessary electric field generated by the driving voltage supplied to the voltage supply electrode 403A is suppressed.

Figure 4:
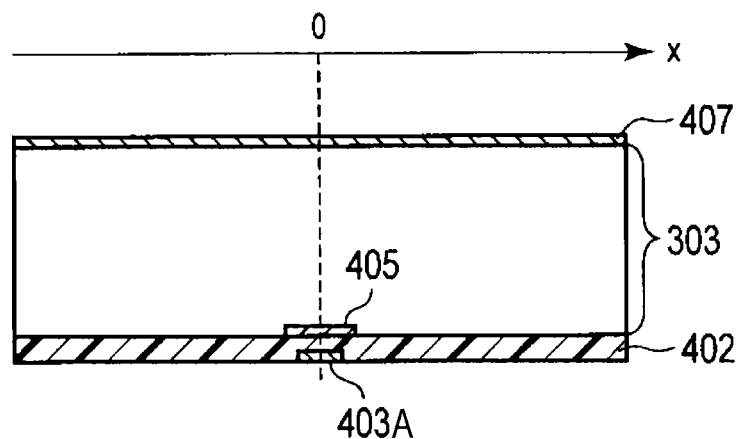
FIG. 4 is a figure showing a model used in a simulation.

Hereafter, the function of the shield electrode 405 is explained. The shield electrode 405 covers the voltage supply electrode 403A so that unnecessary electric field may not occur between the voltage supply electrode 403A and the counter electrode 407. Especially, in the case where the selection display area 101 is partially formed in the fixed display area 102, a driving voltage, which is different from the driving voltage supplied to the fixed display area 102 is supplied to the selection display area 101 through the voltage supply electrode 403A for exclusive use, which passes the fixed display area 102 from the perimeter portion of the display area 100. Therefore, there is a possibility that unnecessary electric field may occur in a boundary portion between the selection display area 101 and the fixed display area 102. When unnecessary electric field occurs, the alignment defect arises in the liquid crystal layer, and there is a possibility that uneven coloring, etc., may be sighted in the boundary portion. For this reason, the shield electrode 405 is arranged in parallel to the voltage supply electrode 403A so that the shield electrode 405 may overlap with the voltage supply electrode 403A which crosses the boundary portion between the selection display area 101 and the fixed display area 102. Here, the inventors performed a simulation in order to evaluate the effect of the shield electrode 405. FIG. 4 is a figure showing a model used in the simulation. As shown in FIG. 4, in order to check the effect of the shield electrode 405, the alignment control electrodes 404A, 404B are eliminated in the model. This is for eliminating the influence of electric field by the alignment control electrodes 404A, 404B.

Figure 5:
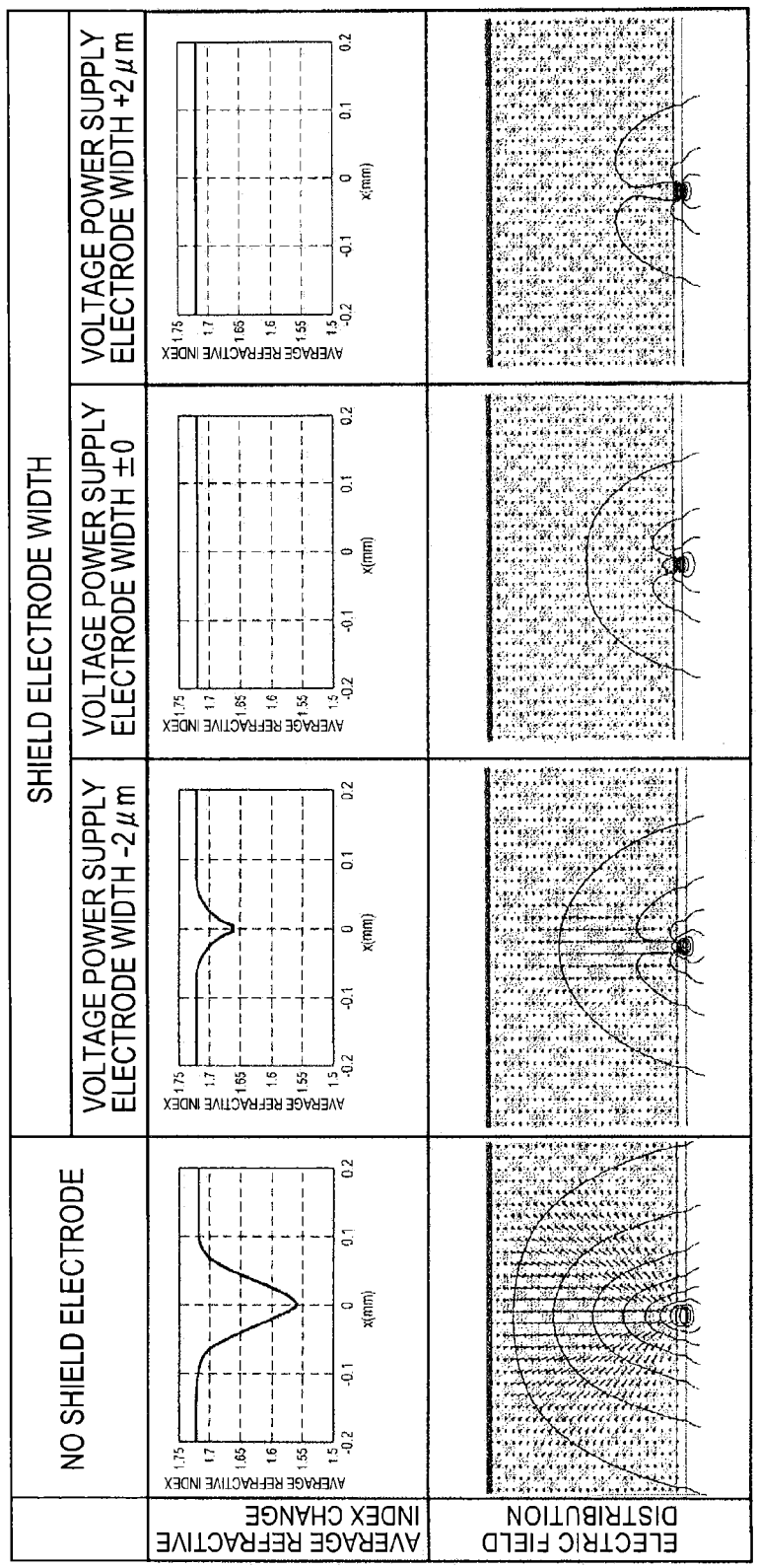
FIG. 5 is a figure showing the result of the simulation.

FIG. 5 shows the result of the simulation. FIG. 5 shows an average refractive index distribution and an electric field distribution of the liquid crystal layer 303 by the simulation using the following four conditions, i.e., (1) when there is no shield electrode 405, (2) electrode width of the shield electrode 405 is made smaller (−2 µm) than the voltage supply electrode 403A, (3) when electrode width of the shield electrode 405 is made equal to the voltage supply electrode 403A, and (4) electrode width of the shield electrode 405 is made larger (+2 µm) than the voltage supply electrode 403A. Furthermore, the electrode width of the voltage supply electrode 403A was set to 8 µm, and the magnitude of impressed voltage was set to 4V. It is suitable that the shield electrode 405 is set to an earth potential (0V) or a counter electrode potential supplied to the counter electrode 407 in order to develop sufficient shielding effect. In this embodiment, the shield electrode 405 was set to 0V which is the same as that of the counter electrode 407.

Moreover, a horizontal axis x in FIG. 5 shows positions in the width direction of the electrodes when center positions of the shield electrode 405 and the voltage supply electrode 403A shown in FIG. 4 are set to a reference value 0, respectively. In addition, a symbol (-) shows the position in the left-hand side direction, and non-symbol shows the position in the right-hand side direction. A vertical axis shows the average refractive index corresponding to the positions.

As shown in FIG. 5, when there is no shield electrode 405, it turns out that the refractive index becomes the minimum in the center position of the voltage supply electrode 403A, and electric field distribution occurs greatly. This is because electric field occurs between the voltage supply electrode 403A and the counter electrode 407, and the liquid crystal molecule of the liquid crystal layer 303 aligns with the electric field. If the reduction of the refractive index is generated, a portion of the liquid crystal layer 303 corresponding to the voltage supply electrode 403A functions as a concave lens. Accordingly, the image light from the display panel 200 is expanded, and the uneven coloring which is not intended occurs.

Next, when the width of the shield electrode 405 is smaller than the width of the voltage supply electrode 403A, the degree of the average refractive index change becomes smaller and generating of the electric field distribution also becomes weak compared with the case where there is no shield electrode 405. Accordingly, the alignment of the liquid crystal molecule is controlled. For this reason, it is possible to control reduction in the refractive index.

Furthermore, when the width of the shield electrode 405 is set to equal to that of the voltage supply electrode 403A, the change of the average refractive index is hardly generated, but the electric field distribution is generated comparatively greatly. There is a possibility that the electric field turns around an edge of the shield electrode 405, and gives bad influence to the liquid crystal layer 303. Then, when the width of the shield electrode 405 is set more greatly than the width of the voltage supply electrode 403A, it becomes possible to control the average refractive index change, and thereby hardly to generate the alignment change of the liquid crystal molecule. As a consequence, it becomes possible to prevent the decrease in the refractive index. Further, since the electric field distribution can also be made very small, it becomes possible to control the loop phenomenon of the electric field generated by the voltage supply electrode 403A, and to obtain much better result.

As explained above, according to this embodiment, it is possible to control generating of electric field between the voltage supply electrode 403A and the counter electrode 407, and to control the refractive index change of the unintended portion of the liquid crystal layer 303 by arranging the shield electrode 405 in parallel with the voltage supply electrode 403A. Since the loop of the electric field generated by the voltage supply electrode 403A is effectively suppressed, it becomes possible to make hardly cause the refractive index change by setting the width of the shield electrode 405 equal to or larger than that of the voltage supply electrode 403A.

Moreover, according to this embodiment, since the alignment control electrode portion 405A is provided in the boundary portion between the selection display area 101 and the fixed display area 102 along the alignment control electrodes 404A, 404B as shown in FIGS. 3A, 3B and 3C, it becomes possible to control the alignment of the liquid crystal molecule in the boundary portion. Thereby, the refractive index change in the liquid crystal layer 303 corresponding to the portion in which the alignment control electrode portion 405A is formed is also controlled. The portion in which the alignment control electrode portion 405A is formed is located between the adjacent alignment control electrodes 404A, 404B in the boundary portion between the selection display area 101 and the fixed display area 102. It is possible to divide clearly the selection display area 101 and the fixed display area 102, without being accompanied with generating of uneven coloring by forming the alignment control electrode portion 405A similar to the shield electrode 405 in the boundary portion.

Furthermore, it is possible to simultaneously form the shield electrode 405 and the alignment control electrodes 404A, 404B using one process by forming the shield electrode 405 and the alignment control electrodes 404A, 404B on the same layer.

Moreover, although the above embodiment explains the case where the partial three-dimensional display is performed in the selection display area 101, and the second-dimensional display is performed in the fixed display area 102, this may be carried out reversely, i.e., the second-dimensional display is performed in the selection display area 101 and the three-dimensional display is performed in the fixed display area 102. It is also possible to switchover to a full screen of the three-dimensional display or a full screen of the second-dimensional display by selection of signals or driving voltages.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic image display device, comprising:
   a display panel including a first display area switchable to a two-dimensional display mode or a three-dimensional display mode and a second display area; and
   a liquid crystal lens unit arranged on a surface side of the display panel and having a liquid crystal layer, distribution of refractive index of the liquid crystal layer being changed by impression of voltage between a first substrate and a second substrate facing the first substrate; wherein
   the first substrate includes a first electrode formed in the first and second display areas for controlling alignment of the liquid crystal layer, a second electrode formed in a different layer from the first electrode arranged on the second display area and extending to the first display area for supplying a voltage to the first electrode of the first display area, and a third electrode arranged between the second electrode and the liquid crystal layer in the second display area so that the third electrode has an overlap region with the second electrode in plane,
   the second substrate includes a fourth electrode formed so as to control the alignment of the liquid crystal layer with the first electrode, and
   the third electrode has a width equal to or larger than the second electrode in plane.

2. The stereoscopic image display device according to claim 1, wherein the first electrode and the third electrode are formed in the same layer.

3. The stereoscopic image display device according to claim 1, wherein the first display area is arranged in the second display area.

4. The stereoscopic image display device according to claim 1, wherein a driving voltage supplied to the first display area is larger than that supplied to the second display area.

5. The stereoscopic image display device according to claim 1, wherein the three-dimensional display is made in the first display area, and the two-dimensional display or the three-dimensional display is made in the second display area.

6. A stereoscopic image display device, comprising:
   a display panel including a first display area switchable to two-dimensional display mode or three-dimensional display mode and a second display area; and
   a liquid crystal lens unit arranged on a surface side of the display panel and having a liquid crystal layer, distribution of refractive index of the liquid crystal layer being changed by impression of voltage between a first substrate and a second substrate facing the first substrate: wherein
   the first substrate includes a first electrode formed in the first and second display areas for controlling alignment of the liquid crystal layer, a second electrode formed in a different layer from the first electrode arranged on the second display area extending to the first display area for supplying a voltage to the first electrode of the first display area, and a third electrode arranged between the second electrode and the liquid crystal layer so that the third electrode has an overlap region with the second electrode in plane in a boundary portion between the first area and the second area,
   the second substrate includes a fourth electrode formed so as to control the alignment of the liquid crystal layer with the first electrode, and
   the third electrode has a width equal to or larger than the second electrode in plane.

7. The stereoscopic image display device according to claim 6, wherein an alignment control electrode portion is formed in the boundary portion between the first display area and the second display area to control the alignment of the liquid crystal layer in the boundary portion.

8. The stereoscopic image display device according to claim 7, wherein the alignment control electrode portion is integrally formed with the third electrode.

9. The stereoscopic image display device according to claim 6, wherein the first electrode and the third electrode are formed in the same layer.

10. The stereoscopic image display device according to claim 6, wherein the first display area is arranged in the second display area.

* * * * *